(12) United States Patent
Butler

(10) Patent No.: US 7,591,486 B2
(45) Date of Patent: Sep. 22, 2009

(54) FLUID CONNECTOR

(75) Inventor: Andrew M Butler, Novi, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 572 days.

(21) Appl. No.: 11/358,157

(22) Filed: Feb. 21, 2006

(65) Prior Publication Data

US 2007/0001455 A1    Jan. 4, 2007

Related U.S. Application Data

(60) Provisional application No. 60/696,323, filed on Jul. 1, 2005.

(51) Int. Cl.
*F16L 41/08* (2006.01)
*F16L 41/12* (2006.01)
*F16L 41/14* (2006.01)
*F16L 5/08* (2006.01)

(52) U.S. Cl. ............... 285/142.1; 285/137.11; 285/194; 285/205; 285/206

(58) Field of Classification Search ............ 285/137.11, 285/142.1, 192, 194, 202, 205, 206, 207, 285/208
See application file for complete search history.

(56) References Cited

U.S. PATENT DOCUMENTS

| | | | | |
|---|---|---|---|---|
| 879,330 A * | 2/1908 | Seaweard | ................... | 285/206 |
| 2,819,099 A * | 1/1958 | Rittle | ......................... | 277/626 |
| 3,001,804 A * | 9/1961 | Tomlinson et al. | ..... | 285/137.11 |
| 4,225,161 A * | 9/1980 | Smith | .................... | 285/137.11 |
| 5,163,716 A * | 11/1992 | Bolton et al. | ............ | 285/142.1 |
| 5,516,157 A * | 5/1996 | Williamson | ................. | 285/212 |
| 5,603,152 A * | 2/1997 | Le et al. | ........................ | 29/506 |
| 5,727,304 A * | 3/1998 | Eybergen | ................. | 29/525.04 |
| 6,095,777 A * | 8/2000 | Nishihata et al. | ........... | 418/55.1 |
| 6,193,283 B1 * | 2/2001 | Pickett et al. | .......... | 285/137.11 |
| 6,312,020 B1 * | 11/2001 | Ketcham et al. | ......... | 285/142.1 |
| 6,318,768 B1 * | 11/2001 | Gehres | ...................... | 285/368 |
| 6,669,239 B1 | 12/2003 | Entringer et al. | | |
| 6,908,117 B1 * | 6/2005 | Pickett et al. | .......... | 285/137.11 |
| 2003/0214130 A1 * | 11/2003 | Schroeder et al. | ........... | 285/205 |

* cited by examiner

*Primary Examiner*—James M Hewitt
(74) *Attorney, Agent, or Firm*—Ralph E. Smith

(57) ABSTRACT

A fluid connector includes a first conduit and a collar. The first conduit is hollow and has a fluid passageway. The collar is also hollow and encircles the first conduit, and includes an externally positioned attachment mechanism. The collar has an internal bore at a first end for inserting a second conduit. Also, a fluid connector assembly includes the fluid connector, a mating portion and a second conduit. The mating portion is attached to the second conduit and encircles it. The collar is inserted into an internal bore in the mating portion, so that the first conduit is aligned to the second conduit.

20 Claims, 3 Drawing Sheets

FLUID CONNECTOR

CROSS-REFERENCE TO RELATED APPLICATION

This application claims the benefit of U.S. Provisional Application No. 60/696,323, filed Jul. 1, 2005.

BACKGROUND

The present invention generally relates to fluid connectors. More particularly, the present invention relates to fluid connectors that ensure alignment in conduits.

Many areas in the industry, especially automobile industry, require fluid connectors that allow secure transmission of fluids. Various types of connectors for connecting a conduit to a fluid transmission system exist in the art. The most commonly used one is a simple O-ring encircling an end of a pipe to be connected to another fluid carrying pipe. Both the pipes are connected using a coaxial fastener, which encircles the pipes and holds them in place. Hand held tools are used to apply torque for tightening the coaxial fastener. This process is time consuming and could lead to lack in alignment of the pipes. Misalignment of the pipes can result in pinching and cutting of the O-ring causing leakage of the fluid at the joint.

Another type of fluid connector, which is typically used in automotive A/C systems, is a dual plane seal. A dual plane seal includes a male portion and a receiving connector. The male portion has a pilot having an O-ring and a flange portion having a surface seal. The receiving connector has an internal bore into which the pilot is inserted. The pilot and the internal bore are axially aligned. The receiving connector also has a stud, which is inserted into a hole in the male portion. A retaining nut is fitted on the stud and tightened using a nut driver. This holds the male portion and the receiving connector together. In this assembly, once the male portion is located over the stud, the pilot is the only means of guidance. If the pilot is not precisely aligned with the internal bore of the receiving connector, it may lead to damage to the pilot and the internal bore. When the misaligned male portion and receiving connector are pressed together using the retaining nut, it may result in a cut or pinched O-ring. This damage to the O-ring leads to fluid leakage.

Hence, there is a need for a fluid connector that allows proper alignment between the mating components of the assembly. The fluid connector should also be able to eliminate pinched or cut O-rings, thereby reducing the manufacturing and maintenance costs. The fluid connector should also have a low assembly time and should require low torques during assembly. Further, the fluid connector should be able to reduce leakage and emission of toxic fluids and refrigerants, used in automotive A/C systems, so as to minimize environmental impact and curb the amount of greenhouse gases in the atmosphere.

SUMMARY

It is an object of the present invention to provide a fluid connector that allows proper alignment of mating components.

Another object of the present invention is to provide a fluid connector that eliminates pinching or cutting of O-rings, thus reducing the manufacturing and maintenance costs.

Another object of the present invention is to provide a fluid connector that has low assembly time.

Yet another object of the present invention is to provide a fluid connector that requires application of low torques for assembly.

Yet another object of the present invention to provide a fluid connector that provides protection to a connecting end of a conduit and the O-ring seal.

Yet another object of the present invention is to provide a fluid connector that provides a protected, pocketed, dust, moisture or other contaminant seal.

The present invention provides a fluid connector having a first conduit and a collar. The first conduit has a fluid passageway. The first conduit further has at least an O-ring at its connecting end. The collar may be attached to the first conduit or may be an integral part of the conduit, in accordance with various embodiments of the invention. The collar encircles the connecting end of the first conduit. The collar further has an externally positioned attachment mechanism, which is used to attach the fluid connector to a mating portion.

The fluid connector aligns the first conduit to the second conduit even before they come into contact, thereby eliminating cutting and pinching O-rings. This reduces the manufacturing and maintenance cost of the fluid connector assembly. This alignment of the first conduit and the second conduit reduces the assembly time of the fluid connector assembly. The collar provides protection to the connecting end of the first conduit and the O-ring by encircling the connecting end of the first conduit. The fluid connector requires low torques during assembly. The seal being used in the fluid connector assembly, for preventing the connection from dust and moisture, requires less compressive force, thereby reducing the torque required. Further, the seal is pocketed so that it cannot be easily damaged.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DESCRIPTION OF PREFERRED EMBODIMENTS

The present invention describes a fluid connector having a first conduit and a collar. The collar encircles a connecting end of the first conduit. Further, the collar has an internal bore at a first end. A second conduit, to be attached to the first conduit, is inserted into the collar from the internal bore at the first end. A connecting end of the second conduit is encircled by a mating portion. The mating portion and the collar ensures alignment between the first conduit and the second conduit. In one embodiment, the fluid connector is suitable for use in automotive air-conditioning (A/C) systems for transmission of fluids.

Figure 1:
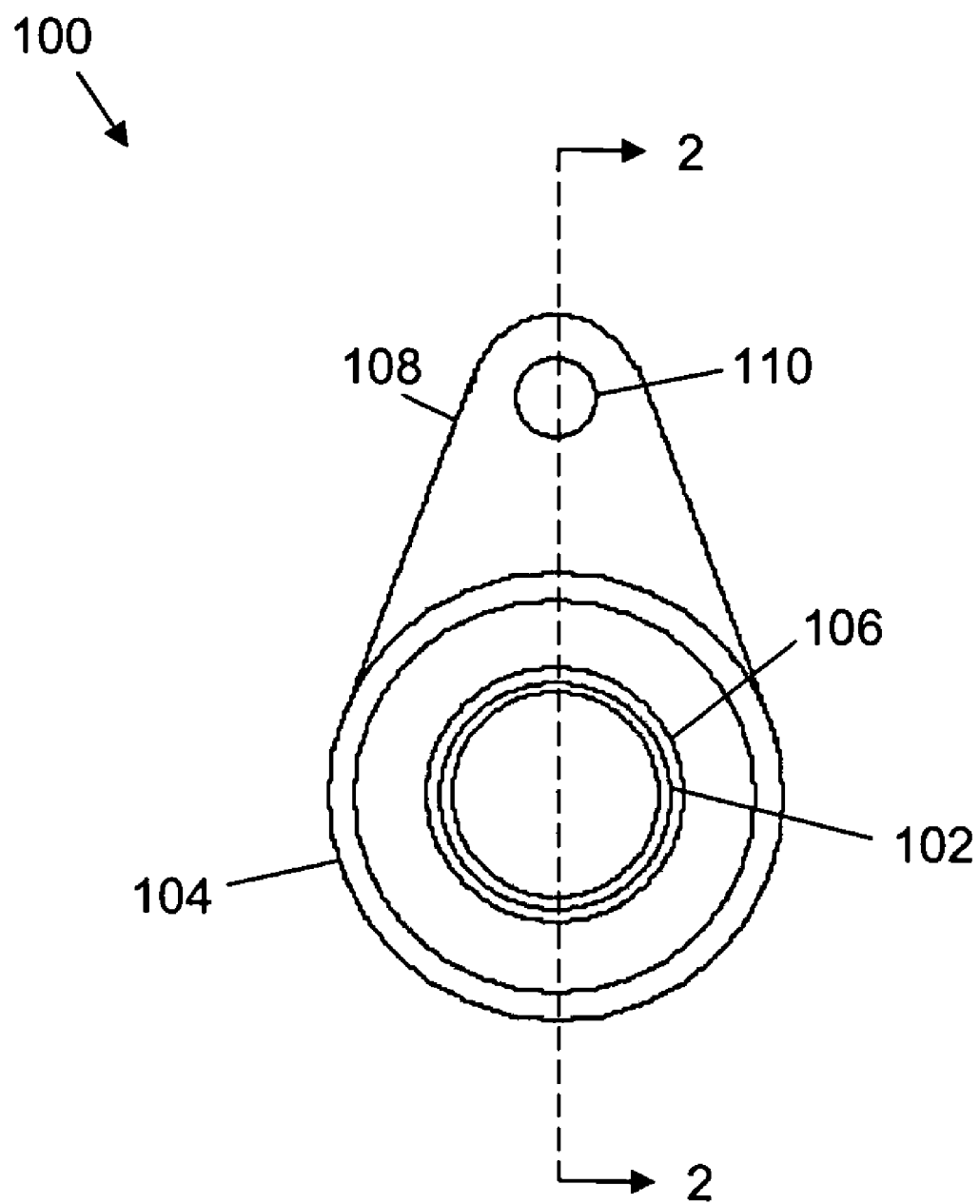
FIG. 1 is a front view of a fluid connector, in accordance with an embodiment of the present invention.

FIG. 1 shows the front view of a fluid connector 100, in accordance with an embodiment of the invention. Fluid connector 100 includes a first conduit 102 and a collar 104. First conduit 102 is a hollow pipe having a fluid passageway for the flow of fluid. In various embodiments of the invention, first conduit 102 can be a tube, a pipe, a hose, and the like. An O-ring seal 106 is mounted on at least one end of first conduit 102 for preventing the leakage of fluid from the first conduit after assembly. In another embodiment of the invention, two or more O-ring seals may be mounted on the ends of first conduit 102. O-ring seal 106 may be made from leak preventing materials such as rubber.

Collar 104 is a hollow structure, which encircles a connecting end of first conduit 102. First conduit 102 is connected to a second conduit at the connecting end. In one embodiment of the invention, collar 104 may be attached to the connecting end of first conduit 102 through interference fit or press fit. In another embodiment of the invention, collar 104 may be an integral part of first conduit 102. In an embodiment of the invention, collar 104 is circular in shape. Collar 104 includes an externally positioned attachment mechanism, which in this embodiment is in the form of a protrusion 108 on its outer surface at one of its ends. In an embodiment, protrusion 108 has a hole 110 near its far end. Hole 110 is used to attach collar 104 securely to a mating portion by means such as a bolt or a stud and nut. It is noted that other attachment mechanisms could be used, such as a quick connect type snap arrangement. Collar 104 may be manufactured using aluminum alloys or any other appropriate metals or alloys. Plastics may be used for manufacturing collar 104 for use in low-pressure applications. Collar 104 is explained in detail in conjunction with FIG. 2.

Figure 2:
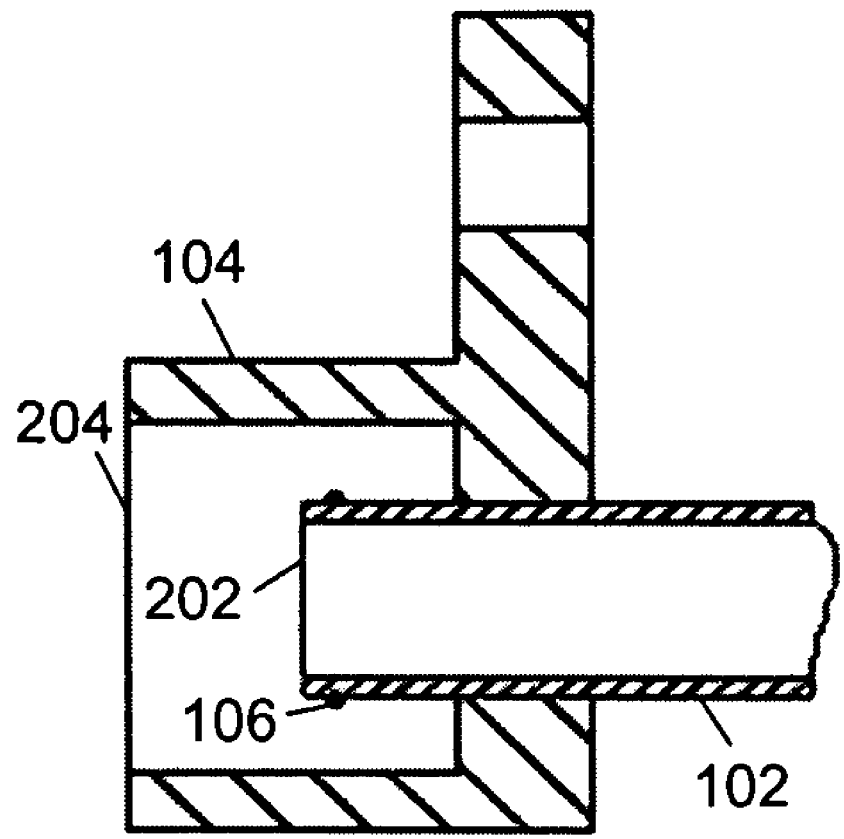
FIG. 2 is a cross sectional view of the fluid connector through cut line 2-2 of FIG. 1, in accordance with an embodiment of the present invention.

FIG. 2 is a cross sectional view of fluid connector 100 through cut line 2-2 of FIG. 1, in accordance with an embodiment of the invention. First conduit 102 has a connecting end 202, which is connected to the second conduit during assembly. At least one O-ring 106 is mounted at connecting end 202, so as to make the connection at connecting end 202 leak proof. Collar 104 encircles connecting end 202 of first conduit 102. A first end 204 of collar 104 has an internal bore for inserting the second conduit, so that it can be connected to first conduit 102. Collar 104 may be attached to first conduit 102 through an interference fit or a press fit, in accordance with an embodiment of the invention. In another embodiment of the invention, collar 104 may be an integral part of first conduit 102.

Figure 3:
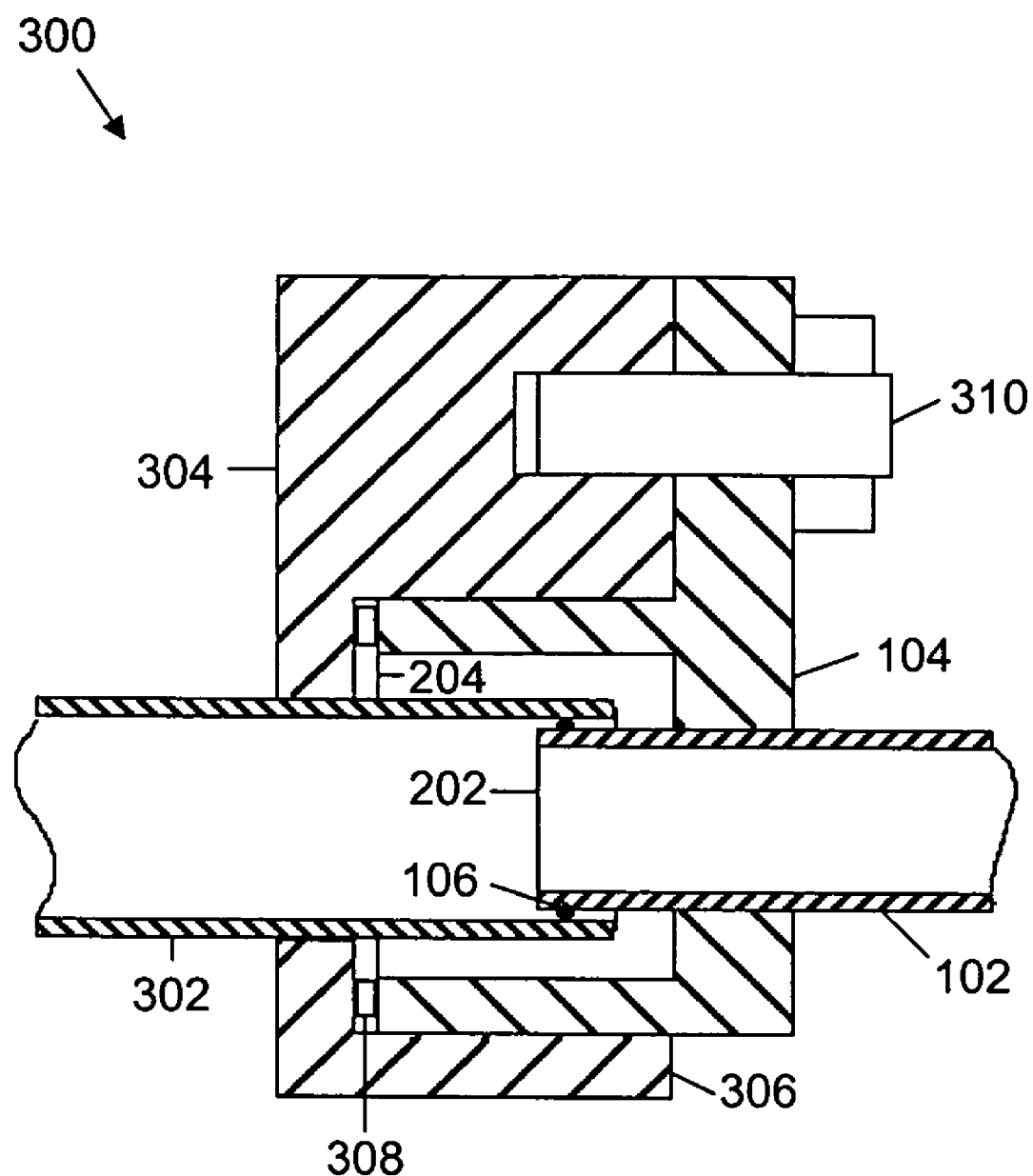
FIG. 3 is a cross sectional view of a fluid connector assembly using the fluid connector, in accordance with an embodiment of the present invention.

FIG. 3 is a cross sectional view of a fluid connector assembly 300 using fluid connector 100, in accordance with an embodiment of the invention. Fluid connector assembly 300 includes fluid connector 100, a second conduit 302 and a mating portion 304. Second conduit 302 is a hollow pipe having a fluid passageway. In various embodiments of the invention, second conduit 302 can be a tube, a pipe, a hose, and the like. Second conduit 302 is connected to connecting end 202 of first conduit 102 during the assembly of the fluid connector. Mating portion 304 encircles the portion of second conduit 302, which is connected to connecting end 202. Mating portion 304 is attached to second conduit 302 through an interference fit or a press fit, in accordance with an embodiment of the invention. In another embodiment of the invention, mating portion 304 is an integral part of second conduit 302. An end 306 of mating portion 304 has an internal bore for inserting first conduit 102. Mating portion 304 may be manufactured using aluminum alloys or any other appropriate metals or alloys. Plastic can also be used for manufacturing mating portion 304, for use in places having moderate pressure and temperature.

During assembly, first end 204 of collar 104 in fluid connector 100 is inserted in the internal bore at end 306 of mating portion 304. In an embodiment of the invention, there is a close tolerance between the outer diameter of collar 104 and the inner diameter of the internal bore at end 306. This ensures precise axial alignment between first conduit 102 and second conduit 302 even before they come in contact. This prevents any damage to O-ring 106 during assembly and also reduces the assembly time. For example, the tolerance is maintained in the range of 0.25 mm to 0.50 mm, depending upon the size and length of collar 104 with respect to the length of first conduit 102. Typically, the tolerance is maintained at 0.25 mm. Also, there is a clearance fit between the inner diameter of second conduit 302 and the outer diameter of first conduit 102. O-ring seal 106, mounted on connecting end 202, seals the clearance, thereby preventing fluid leakage from the junction.

In an embodiment of the invention, a seal 308 is compressed between first end 204 of collar 104 and mating portion 304. Seal 308 protects the junction formed at connecting end 202 of first conduit 102 from moisture, dust and other contaminants, thereby increasing the life span of the junction. Examples of seal 308 include an O-ring, a compression washer, a slim line seal and a Dowty type washer.

In an embodiment of the invention, collar 104 and mating portion 304 are held together by a stud and nut 310. The nut may be tightened on the stud by means of a spanner or nut runner. In another embodiment of the invention, a bolt is used for holding collar 104 and mating portion 304 together.

An advantage of the fluid connector is that it aligns the first conduit to the second conduit even before they come into contact, thereby eliminating cutting and pinching of O-rings. This reduces the manufacturing and maintenance cost of the fluid connector assembly. The easy alignment of the mating parts reduces the assembly time of the fluid connector assembly. Further, the collar provides protection to the connecting end of the first conduit and the O-ring during assembly. The fluid connector also requires low torques during assembly as compared to dual plane seals. The seal being used in the fluid connector assembly, for preventing the connection from dust and moisture, requires less compressive force as compared to the conventional surface seal used in a dual plane seal design, thereby reducing the torque required. Further, the seal is pocketed so that it cannot be damaged as readily as the seal being used in the dual plane seal design. Also, the seal prevents the junction from dust, moisture and other contaminants.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention, as described in the claims.

What is claimed is:

1. A fluid connector comprising:
   a. a first conduit, the first conduit having a fluid passageway; and
   b. a hollow collar, the collar having an externally positioned attachment mechanism, the collar encircling a connecting end of the first conduit, the collar having an internal bore at a first end,
   c. a mating portion comprised of a pocket in which at least a portion of the collar is received with the internal bore and pocket defining a chamber in which the connecting end of the first conduit is disposed,
   d. a second conduit having a fluid passageway that is encircled by the mating portion and having a connecting end disposed in the chamber that is aligned and in registry with the connecting end of the first conduit,
   e. wherein the first conduit is disposed within the second conduit such that a space is formed in the radial direction between the outer surface of the second conduit and the inner surface of the hollow collar and between the outer surface of the first conduit and the inner surface of the hollow collar.

2. The fluid connector according to claim 1 wherein the connecting end of the first conduit has at least one O-ring seal to prevent fluid leakage.

3. The fluid connector according to claim 1 wherein the collar is attached to the first conduit through an interference fit.

4. The fluid connector acconling to claim 1 wherein the collar is an integral part of the first conduit.

5. The fluid connector according to claim 1 wherein the externally positioned attachment mechanism comprises a protrusion on its outer surface, the protrusion having a hole formed therein near a free end through which a fastener is received for attaching the collar to the mating portion.

6. The fluid connector according to claim 1 wherein the collar is manufactured from a material selected from a group consisting of an alloy, a metal and a plastic.

7. The fluid connector according to claim 1 wherein the outer surface of the collar is circular in shape.

8. A fluid connector assembly comprising:
   a. a first conduit, the first conduit having a fluid passageway;
   b. a hollow collar, the collar having an externally positioned attachment mechanism, the collar encircling a connecting end of the first conduit, the outer surface of the collar being circular in shape, the collar having an internal bore at a first end;
   c. a mating portion, the mating portion having an internal bore at an end for inserting the collar such that the internal bore of the mating portion is axially aligned with the internal bore of the collar; and
   d. a second conduit, the second conduit having a fluid passageway, the second conduit being attached to the connecting end of the first conduit such that the conduits are axially aligned.
   e. wherein the first conduit is disposed within the second conduit such that a space is formed in the radial direction between the outer surface of the second conduit and the inner surface of the hollow collar and between the outer surface of the first conduit and the inner surface of the hollow collar.

9. The fluid connector assembly according to claim 8 wherein the first conduit has at least one O-ring seal to prevent leakage of fluid from the second conduit.

10. The fluid connector according to claim 8 wherein the collar is attached to the first conduit through an interference fit.

11. The fluid connector according to claim 8 wherein the collar is an integral part of the first conduit.

12. The fluid connector according to claim 8 wherein the mating portion is attached to the second conduit through an interference fit.

13. The fluid connector according to claim 8 wherein the mating portion is an integral part of the second conduit.

14. The fluid connector assembly according to claim 8 wherein the second conduit has a diameter more than the diameter of the first conduit.

15. The fluid connector assembly according to claim 8 wherein a seal is placed between the first end of the collar and the mating portion.

16. The fluid connector assembly according to claim 8 wherein the externally positioned attachment mechanism comprises a protrusion at the first end on its outer surface, the protrusion having a hole therein near distal end thereof used in attaching the collar to the mating portion.

17. The fluid connector assembly according to claim 16 wherein a stud and nut is used to hold the collar to the mating portion.

18. The fluid connector assembly according to claim 16 wherein a bolt is used to hold the collar to the mating portion.

19. The fluid connector assembly according to claim 8 wherein the collar is manufactured from a material selected from a group consisting of an alloy, a metal and a plastic.

20. The fluid connector assembly according to claim 8 wherein the mating portion is manufactured from a material selected from a group consisting of an alloy, a metal and a plastic.

* * * * *